US012323503B1

United States Patent
Chamaria

(10) Patent No.: US 12,323,503 B1
(45) Date of Patent: Jun. 3, 2025

(54) METHOD FOR TRANSMITTING NOTIFICATION TO TARGET DEVICE VIA HIERARCHY OF COMMUNICATION CHANNELS

(71) Applicant: MoEngage Inc., San Francisco, CA (US)

(72) Inventor: Umang Chamaria, Mangalam (IN)

(73) Assignee: MoEngage Inc., San Francisco, CA (US)

( * ) Notice: Subject to any disclaimer, the term of this patent is extended or adjusted under 35 U.S.C. 154(b) by 0 days.

(21) Appl. No.: 18/911,849

(22) Filed: Oct. 10, 2024

(51) Int. Cl.
*H04L 69/08* (2022.01)

(52) U.S. Cl.
CPC .................... *H04L 69/08* (2013.01)

(58) Field of Classification Search
CPC ..... H04L 69/08; H04L 41/06; H04L 41/0622; H04L 41/0677; H04L 51/224
See application file for complete search history.

(56) References Cited

U.S. PATENT DOCUMENTS

| | | | | |
|---|---|---|---|---|
| 2007/0098007 | A1* | 5/2007 | Prodan | H04N 7/17309 348/E7.07 |
| 2015/0288526 | A1* | 10/2015 | McLean | G01R 31/31705 713/168 |
| 2017/0161973 | A1* | 6/2017 | Katta | G06Q 40/08 |
| 2019/0066089 | A1* | 2/2019 | Miryala | G06Q 20/367 |
| 2020/0022002 | A1* | 1/2020 | Karanam | G10L 21/0364 |
| 2020/0296135 | A1* | 9/2020 | Lemsitzer | H04L 63/0807 |
| 2024/0364682 | A1* | 10/2024 | Yamada | G06F 9/547 |

FOREIGN PATENT DOCUMENTS

| | | |
|---|---|---|
| CN | 108063724 A | 5/2018 |
| CN | 115623064 A | 1/2023 |
| CN | 110769064 B | 2/2023 |

\* cited by examiner

*Primary Examiner* — Michael Won
(74) *Attorney, Agent, or Firm* — Jason A. Smith; Shumaker, Loop & Kendrick, LLP

(57) ABSTRACT

A method for transmitting a notification to a target user device via hierarchy of communication channel. The method includes receiving a request to send the notification to the target user device. Further, it is determined that the target user device is an opted-in device enabled to receive the notification. A FCM Token and an OEM token associated with the target user device is obtained. Further, the notification to the target user device using the OEM token via a first channel is transmitted. A failure in receiving the notification by the target user device via the first channel is detected. Further the notification is transmitted to the target user device using the FCM token via a second channel. A failure in receiving the notification via the second channel, by the target user device is detected. Further, the notification to the target user device using a third channel is transmitted.

10 Claims, 5 Drawing Sheets

METHOD FOR TRANSMITTING NOTIFICATION TO TARGET DEVICE VIA HIERARCHY OF COMMUNICATION CHANNELS

PRIORITY INFORMATION

The present application claims priority from Indian Application No. 202411056355 dated Jul. 24, 2024.

TECHNICAL FIELD

The present subject matter described herein, in general, relates to push notifications and hierarchical communication.

BACKGROUND

In today's fast-paced digital world, the timely delivery of push notifications is crucial for businesses to engage effectively with their customers. However, a common technical issue is that user devices often do not receive these notifications promptly, or sometimes not at all. This problem can stem from several factors, including network issues like poor connectivity or congestion, device settings that limit background data usage, and server-side delays in processing or sending notifications. The impact of these delays is significant, as timely push notifications are essential for maintaining customer engagement, driving immediate user actions, and ensuring the success of time-sensitive promotions or alerts. Therefore, overcoming these technical challenges is vital for businesses to ensure reliable and timely communication, which is key to customer satisfaction and competitive success in the digital marketplace.

In today's fast-paced digital world, ensuring the timely delivery of push notifications is crucial for businesses to engage effectively with their customers. However, several technical challenges can prevent user devices from receiving these notifications promptly, or at all. These challenges include: 1. Device Settings and Restrictions: many devices have settings that can interfere with the delivery of push notifications. Battery optimization features, for example, may limit or prevent background data usage to conserve battery life, which can result in delayed or missed notifications. Additionally, app-specific settings and user preferences can block or prioritize certain notifications over others. 2. Operating System Limitations: different operating systems handle push notifications in various ways, and updates or bugs in these systems can impact notification delivery. For instance, some operating systems may have stricter background activity restrictions, which can prevent apps from receiving notifications when they are not actively in use. 3. Server-Side Delays: the servers responsible for sending push notifications can also experience delays. These can be due to high server load, inefficient processing algorithms, or technical issues such as server outages. If the server cannot process and send notifications promptly, users will experience delays. 4. Third-Party Services: many businesses rely on third-party services to manage and send push notifications. Any issues with these services, such as downtime, performance bottlenecks, or integration problems, can hinder the timely delivery of notifications. 5. Message Queue Overloads: when there is a high volume of notifications to be sent simultaneously, message queues can become overloaded. This can lead to delays in processing and delivering notifications, particularly during peak times or large-scale campaigns. 6. Security and Privacy Concerns: some security measures, such as firewalls or VPNs, can block or delay push notifications. Additionally, strict privacy settings on devices or apps can prevent notifications from being delivered if the user has not granted the necessary permissions.

Current systems attempt to address these issues through various methods, but these solutions often fall short. Retry mechanisms and fallback strategies for network-related challenges result in significant delays, especially in areas with consistently poor connectivity. Adaptive algorithms designed to schedule notifications during periods of higher connectivity or device activity can be thwarted by stringent battery optimization settings or user preferences that block background data. While operating systems provide APIs and frameworks to optimize push notification delivery, these are often inconsistent across different platforms and versions, leading to unpredictable results. Server-side optimizations such as load balancing and efficient queue management are sometimes inadequate during peak times or large-scale campaigns, resulting in overloaded message queues and delayed notifications. The reliance on third-party services for managing push notifications introduces risks of downtime and performance bottlenecks, and using multiple services redundantly adds complexity and cost. Additionally, security and privacy measures, including firewalls, VPNs, and strict user permissions, can block or delay notifications, further compromising timely delivery. These shortcomings significantly impact customer engagement and the success of time-sensitive promotions, highlighting the need for innovative solutions. The system and method disclosed herein addresses these challenges by providing a robust and adaptive system that ensures the timely and reliable delivery of push notifications, overcoming the technical limitations of current systems.

SUMMARY

Before the present system(s) and method(s) are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for transmitting a notification to a target user device via hierarchy of communication channels. This summary is not intended to identify essential features of the claimed subject matter nor is it intended for use in determining or limiting the scope of the claimed subject matter.

In one implementation, a method for transmitting a notification to a target user device via hierarchy of communication channels is disclosed. The method comprises receiving a request to send the notification to the target user device. Further, it is determined that the target user device is an opted-in device enabled to receive the notification. A Firebase Cloud Messaging (FCM) Token and an OEM (Original Equipment Manufacturer) token associated with the target user device is obtained. Further, the notification to the target user device using the OEM token via a first channel is transmitted. A failure in receiving the notification by the target user device via the first channel is detected. Further, responsive to detecting the failure, transmitting the notification to the target user device using the Firebase Cloud Messaging (FCM) token via a second channel. A failure in receiving the notification via the second channel, by the target user device is detected. Responsive to detecting the failure, transmitting the notification to the target user device using a third channel.

In yet another implementation, a system for transmitting a notification to a target user device via hierarchy of communication channels is disclosed. The system comprises a memory storing one or more instructions. The memory is communicatively coupled to a processor. The processor upon execution of the one or more stored instructions is configured to receive a request to send the notification to the target user device. Further, it is determined that the target user device is an opted-in device enabled to receive the notification. A Firebase Cloud Messaging (FCM) Token and an OEM (Original Equipment Manufacturer) token associated with the target user device is obtained. Further, the notification to the target user device using the OEM token via a first channel is transmitted. A failure in receiving the notification by the target user device via the first channel is detected. Further, responsive to detecting the failure, transmitting the notification to the target user device using the Firebase Cloud Messaging (FCM) token via a second channel. A failure in receiving the notification via the second channel, by the target user device is detected. Responsive to detecting the failure, transmitting the notification to the target user device using a third channel.

BRIEF DESCRIPTION OF THE DRAWINGS

The foregoing detailed description of embodiments is better understood when read in conjunction with the appended drawings. For the purpose of illustrating the present subject matter, an example of a construction of the present subject matter is provided as figures, however, the invention is not limited to the specific method and system for transmitting a notification to a target user device via hierarchy of communication channels is disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "obtaining", "transmitting", "detecting", "determining" and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for transmitting a notification to a target user device via hierarchy of communication channels. The proposed method and system offer solutions to the technical issues mentioned above and provide various advantages, as will be clear from the following description.

Figure 1:
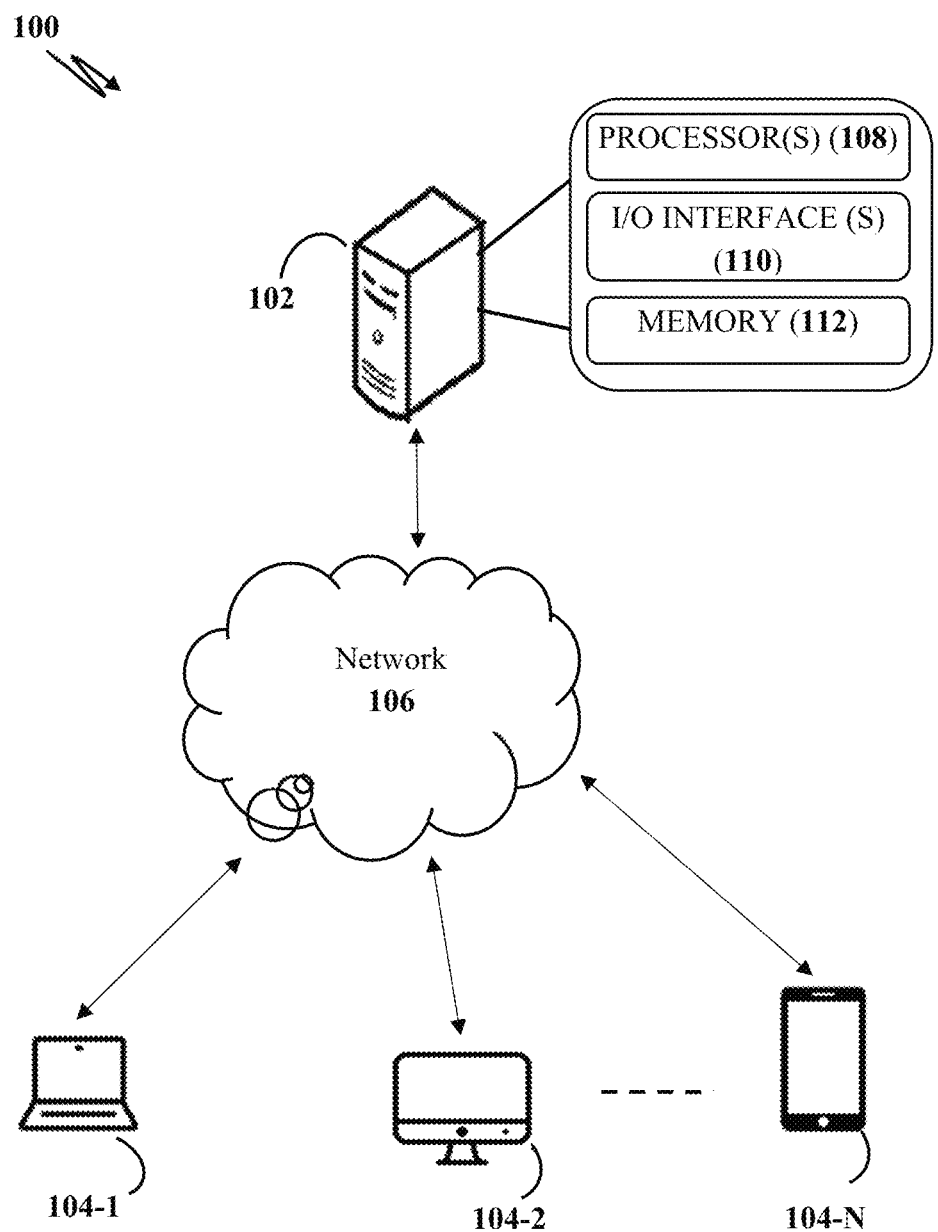
FIG. 1 illustrates a network implementation for transmitting a notification to a target user device via hierarchy of communication channels, in accordance with an embodiment of the present disclosure.

Referring now to FIG. 1, a network 100 implementation for transmitting a notification to a target user device via hierarchy of communication channels is illustrated. The network 100 includes a system 102, one or more user devices 104-N (for example but not limited to one or more user devices 104-1, 104-2 . . . 104-N) associated with one or more users. Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. In one implementation, the system 102 may be implemented in a cloud-based computing environment in which the system is configured to execute or interact with remotely located applications. Further, system 102 and user device 104 may communicate through the network 106. Examples of the user devices 104 may include, but are not limited to, a portable computer, a personal digital assistant, a handheld device, and a workstation.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, a memory 112, and one or more modules explained later in the description. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

Figure 2:
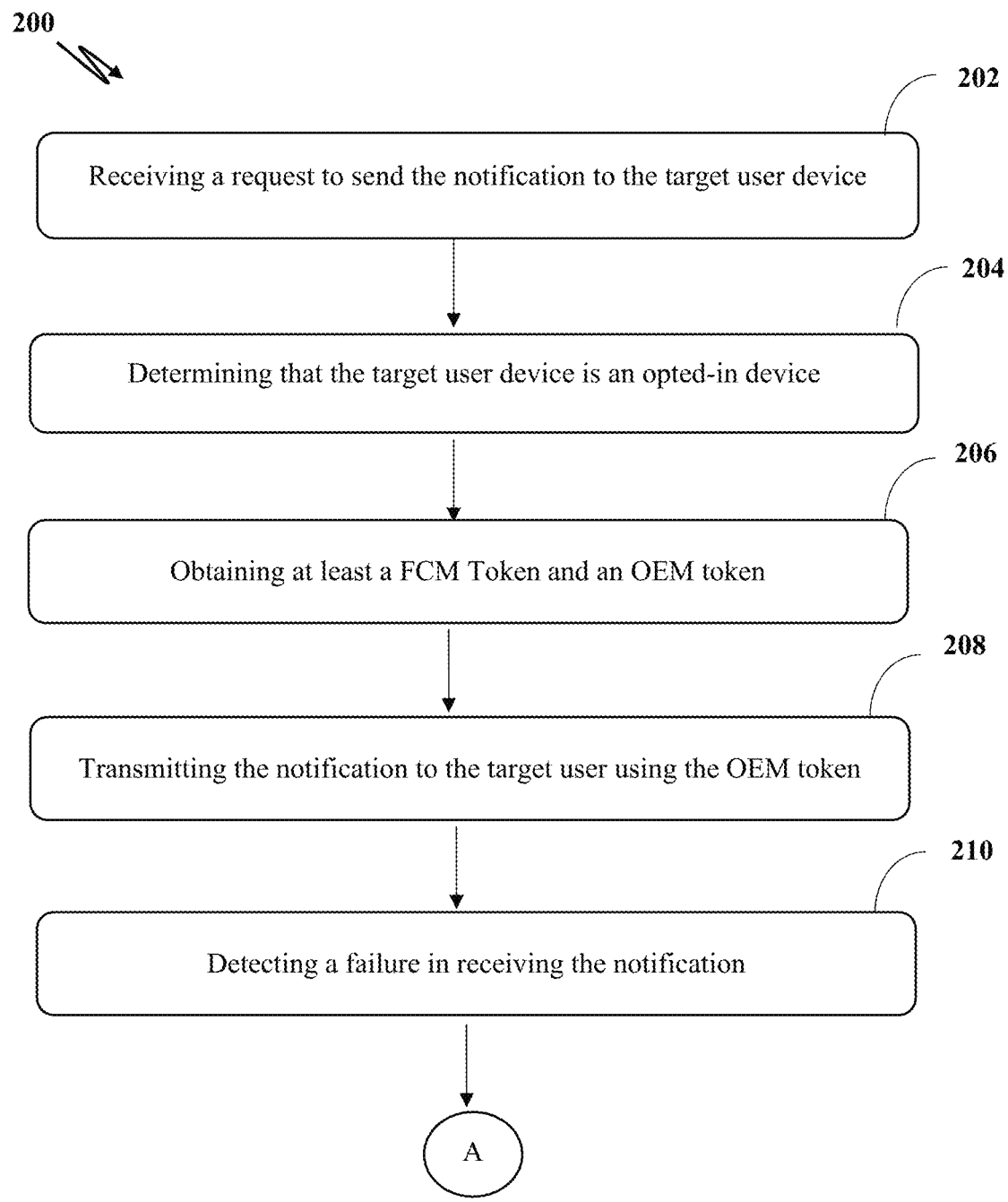
FIG. 2 illustrates a block diagram for transmitting a notification to a target user device via hierarchy of communication channels, in accordance with an embodiment of the present disclosure.
Figure 2A:
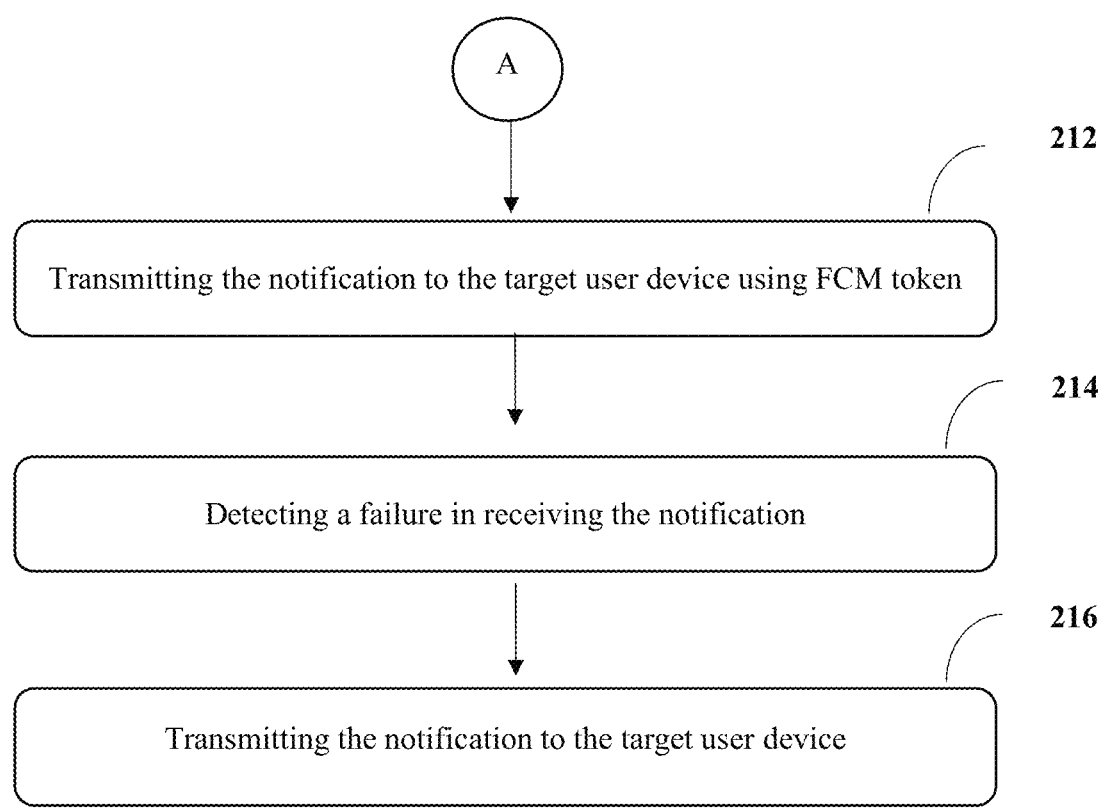
FIG. 2A illustrates a block diagram for transmitting a notification to a target user device via hierarchy of communication channels, in accordance with an embodiment of the present disclosure.

The detailed functioning of the system 102 is described below with the help of FIG. 2. Referring now to FIG. 2, a detailed diagram of the network 100 comprising one or more components of the system interacting with the user device, via web or mobile applications. Referring now to FIG. 2, a method 200 for transmitting a notification to a target user device via hierarchy of communication channels, is shown, in accordance with one or more embodiments of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The method 200 for transmitting notifications may be implemented in any suitable hardware, software, firmware, or combination thereof. However, for ease of explanation, in the embodiments described below, the method 200 may be considered to be implemented in the network 100 of FIG. 1 by the processor(s) 108 of the system 102 in association with the other devices in the network 100.

At step 202, the system may be configured to receive a request to send the notification to the target user device. A target user device may be any electronic device capable of receiving the notification and interacting with users, such as smartphones, tablets, wearables, smart speakers, personal computers, smart TVs, and IoT devices. In an embodiment, the notification may be a push notification. A push notification is a message sent from a server to the target user device to provide timely information or updates. The push notification may be delivered automatically, even when a user is not actively using an application or device. In an embodiment, the target user device may first register with the service provider to receive push notifications. In view of registration the target user device may obtain a unique device token or registration ID. In an embodiment, a user via a graphical interface of the target user device may grant permission for an application or website to send push notifications, ensuring user control and privacy. In an embodiment, the push notification may be delivered even when the application is not in use or running in the background. The push notification may include various types of content, such as text messages, images, videos, or interactive elements like buttons.

In an embodiment, the notification sent to the target user device may be an active notification. A notification that is currently relevant and intended to be delivered to the target user device is called the active notification. The active notification may be active for a predetermined time period. In an embodiment, the active notification may include a pending status indicating that the active notification has not been delivered to the target user device.

In an embodiment, the system may receive the request for sending the notification from one or more marketing platforms, an alert system, or any application needing to communicate with its users. In an embodiment the request may include one or more of: a unique identifier corresponding to the target user device, message to be delivered including text, image, or other media, metadata including additional information like priority level of the request, expiry time of the notification, or any other specific information.

In an embodiment, in response to receiving the request to send the notification, the system, at step 204, may determine that the target user device is an opted-in device enabled to receive the notification. In an embodiment, when a user may install an application on a user device, the application typically requests permission to send push notifications. The application may trigger a system dialog asking the user to allow or deny notifications. This dialog is managed by the operating system (e.g., iOS or Android). The user may respond to the permission request by either opting in (allowing notifications) or opting out (denying notifications). When the user selects allowing notifications the user device may be called as opted in device.

In an embodiment, when the user first launches the application on the user device or registers on the application, the application accesses information of the user device using Application Programming Interface (API). The application may query one or more device related properties via the API, like device model, OS (Operating System) version, and manufacturer details. The application may query this information using one or more commands like Build. MANUFACTURER and 'Build. MODEL' for android user devices and 'UIDevice' to gather necessary information on iOS user devices. In an embodiment the device related information may be stored on the application. In yet another embodiment the device related information may be transmitted to the system 102 for determining the appropriate push notification services. The system may communicate with the respective service provider to determine the appropriate push notification services.

In an embodiment, the system may identify push notification service based on the obtained user device operating system and manufacturer. For example, for iOS devices, the Apple Push Notification Service (APNs) may be used. For Android devices, Firebase Cloud Messaging (FCM) may be commonly used. In some cases, other services like Huawei Mobile Services (HMS) for Huawei devices may also be considered. In an embodiment, the user device may support one or more of the above services.

In an embodiment, the application running on the user device may request the respective server of the service provider for the push notification service to generate unique device tokens for each identified push notification service. The token may be used to send the notifications to the target user device. For example, in case of iOS user device, the Apple Push Notification Service (APNs), which is a cloud-based service provided by Apple, is responsible for generating the token. The application running on the user's iOS device may call a program/subroutine to let the user device contact the APN server. The APNs (the server) generates a unique device token and sends the generated token back to the application running on the user device. In yet another example, in the case of Android user devices, Firebase Cloud Messaging (FCM) service, which is a cloud-based service provided by Google is responsible for generating the token. The application running on the user's Android device uses the Firebase API, to contact the FCM server. The FCM server generates a unique token and sends the token back to the application running on the device. In yet another example, Original Equipment Manufacture's (OEM's) push service (e.g., Samsung Push, Oppo Push, Huawei push, Xiaomi push) which are cloud-based services provided by the respective manufacturers may generate the token. The application running on the user's device requests a token using the respective manufacturer's push service APIs. The user device may contact the respective manufacturers server and the respective manufacturer server may generate the unique token called as OEM token. The server generates the unique token and sends the token back to the application running on the user device. In an embodiment the application may locally store the respective unique token generated by the different services discussed above. In yet another embodiment, the application may send the token to the system 102 to store the unique tokens.

In an embodiment, the application may send information regarding the user device's tokens, which service providers it can receive notifications from, and the user device opt-in state, to the system 102. The application may compile the information in a data package. The data package may contain the unique device tokens for each push service (e.g., APNs token, FCM token, OEM tokens). The data package may contain identifiers indicating which services the tokens belong to (e.g., APNs, FCM, HMS (Huawei Mobile Services (HMS) push service), Xiaomi). The data package may contain the current opt-in status of the user device, confirming whether the user device has allowed push notifications. In an embodiment, the application may securely transmit the data package to the system 102 using a secure communication protocol (e.g., HTTPS). The system 102 may receive the data package and store the data package in a memory. In an embodiment, the system 102 may transmit an acknowledgment to the application confirming receipt and successful processing of tokens and the current opt-in state of the user device.

In an embodiment, at step 204, the system may determine that the target user device is the opted-in device. The determination may be performed by monitoring periodically if the target user device has an application installed for which the notification is to be transmitted. The periodic monitoring may comprise transmitting silent notifications to the target user device at regular intervals of time to determine if the target user device is using the application. The silent notifications do not alert the user visibly or audibly but allow the application to perform tasks in the background and update its status. The system 102 may transmit the silent notifications to the target user device using the appropriate push notification service. For example, For FCM (Android) and APNs (iOS), the system may use their respective APIs to send the notification. In an embodiment, the server may send the silent notification by including a payload that instructs the application to check notification settings. Upon receiving the silent notification, the application performs the check for notification opt-in status and updates its local storage if there is a change. The application may use API's to check the notification setting. The application may detect any change in the target user device's notification preferences since the last time the application checked the settings. The last known notification preferences stored locally may be retrieved to identify any change. The current opt-in status may be compared with the last known stored preference. If both the status differ which indicate that there has been a change in user's preference. The local storage may be updated with the new opt-in status. In an embodiment, if the user device has opted out, the system may stop scheduling or display notifications. By including this systematic monitoring through silent notifications, the application guarantees that it consistently checks the user's notification preferences and adjusts its internal records accordingly without causing any interruption to the user's experience. This method ensures the preservation of precise and current notification settings, hence improving the user's experience by respecting their existing opt-in status.

In an embodiment, at step 206, the system may be configured to obtain at least a Firebase Cloud Messaging (FCM) Token and an OEM (Original Equipment Manufacturer) token associated with the target user device. In an embodiment, the application may send the generated tokens to system 102 over a secure connection (e.g., HTTPS). The system may obtain a data package from the application. The data package may include the unique device tokens for each push service (e.g., FCM token, APNs token, OEM tokens), Service identifiers indicating which services the token belong to (e.g., "FCM", "APNs", "Huawei", "Xiaomi"), additional metadata such as the user's notification opt-in status. The system may store the tokens in a database associating them with the user's account or device identifier. The device identifier may be used to identify the device to which notifications have to be transmitted. In an embodiment, the FCM token and OEM token use different communication protocols and data formats. For example, FCM primarily uses HTTP/HTTPS for communication between application servers and FCM servers. FCM (Extensible Messaging and Presence Protocol) also supports XMPP for bidirectional communication, allowing for real-time message delivery and acknowledgments. JSON is the primary data format used for FCM messages. In another example, OEM specific services may have different protocols. Like Huawei push service may use HTTPS for secure communication between the application server and Huawei's push server. Xiaomi's push service uses HTTP/HTTPS for sending push notifications to Xiaomi devices. Xiaomi uses key-value pairs in URL-encoded format for its messages. JSON format can also be used for more complex payloads. Utilizing many protocols and data formats enables the system to establish effective communication with a wide range of devices and services, guaranteeing extensive compatibility and reach. This improves the system's capacity to consistently send notifications to various types of user devices.

HTTPS, a secure communication protocol, guarantees the safe transmission of notification data, effectively safeguarding it against interception and modification. This is crucial for upholding user confidence and adhering to data protection requirements. Further, OEM-specific protocols and formats are optimized for their respective devices, ensuring efficient and reliable delivery. This decreases the amount of time it takes for notifications to be delivered, resulting in improved user experience. Thus, the ability to use multiple protocols and formats allows the system 102 to scale effectively, handling large volumes of notifications without bottlenecks. This ensures the system can grow with the user base and increasing demand for notifications. The utilization of different protocols and data formats allows for adaptability in managing various situations and resistance against breakdowns in individual communication channels. This enhances the resilience of the notification delivery system, guaranteeing the successful transmission of messages even under unfavourable circumstances.

In an embodiment, at step 208, the system may transmit the notification to the target user device using the OEM token via a first channel. The system may transform the notification into a format compatible with OEM tokens communication protocol. For example, the system may query its database to identify the target device and fetch the associated OEM token. For example, before sending the notification the system may construct a notification payload by including message content, additional metadata (like priority, relevant time period, and the like), unique device identifier and a status field initially set to 'pending'. In an embodiment, when the notification is successfully sent to the target user device. The system may receive an acknowledgement and upon receiving the acknowledgement, the system may update the notification status to 'delivered'. In an embodiment, the system may determine a format compatible with the OEM token. The system then creates the notification payload to match the required format. For example, the system may determine that the user device to be Huawei and the compatible protocol be HTTPS and data format be JSON. The system may then extract the necessary details from the notification payload, such as title, body, and additional metadata (e.g., priority, relevant time period, and the like) and transform these details into the JSON format required by Huawei Push Kit. Thus, the system dynamically transforms the notification payload to match the specific requirements of each OEM's push service, ensuring compatibility and successful delivery. The system standardizes the transformation process, converting notification requests into the required formats for various push services efficiently. In another example for Xiaomi Push Service: protocol: HTTP/HTTPS, data format: Key-Value Pairs (URL-encoded) or JSON. The system may transform the notification payload into a corresponding OEM's format.

In an embodiment, the system sends the transformed notification payload to the corresponding OEM push service endpoint. The OEM push service processes the request and attempts to deliver the notification to the target device. The system may monitor the delivery status of the notification, typically through responses or callbacks from the OEM push service. If the delivery is successful, the system may update the notification status in its database. If the notification is not delivered successfully, the system may implement a retry mechanism to attempt re-delivery. This ensures higher reliability and increases the chances of successful delivery. Using OEM-specific channels can improve the user experience by ensuring notifications are delivered even in environments where generic push services might be restricted or less effective. Transmitting notifications using OEM tokens involves leveraging the push notification services provided by device manufacturers (OEMs) like Huawei, Xiaomi, Samsung, etc. This process ensures that notifications are delivered efficiently, particularly on devices where standard services like FCM might not be fully supported or optimized.

Figure 4:
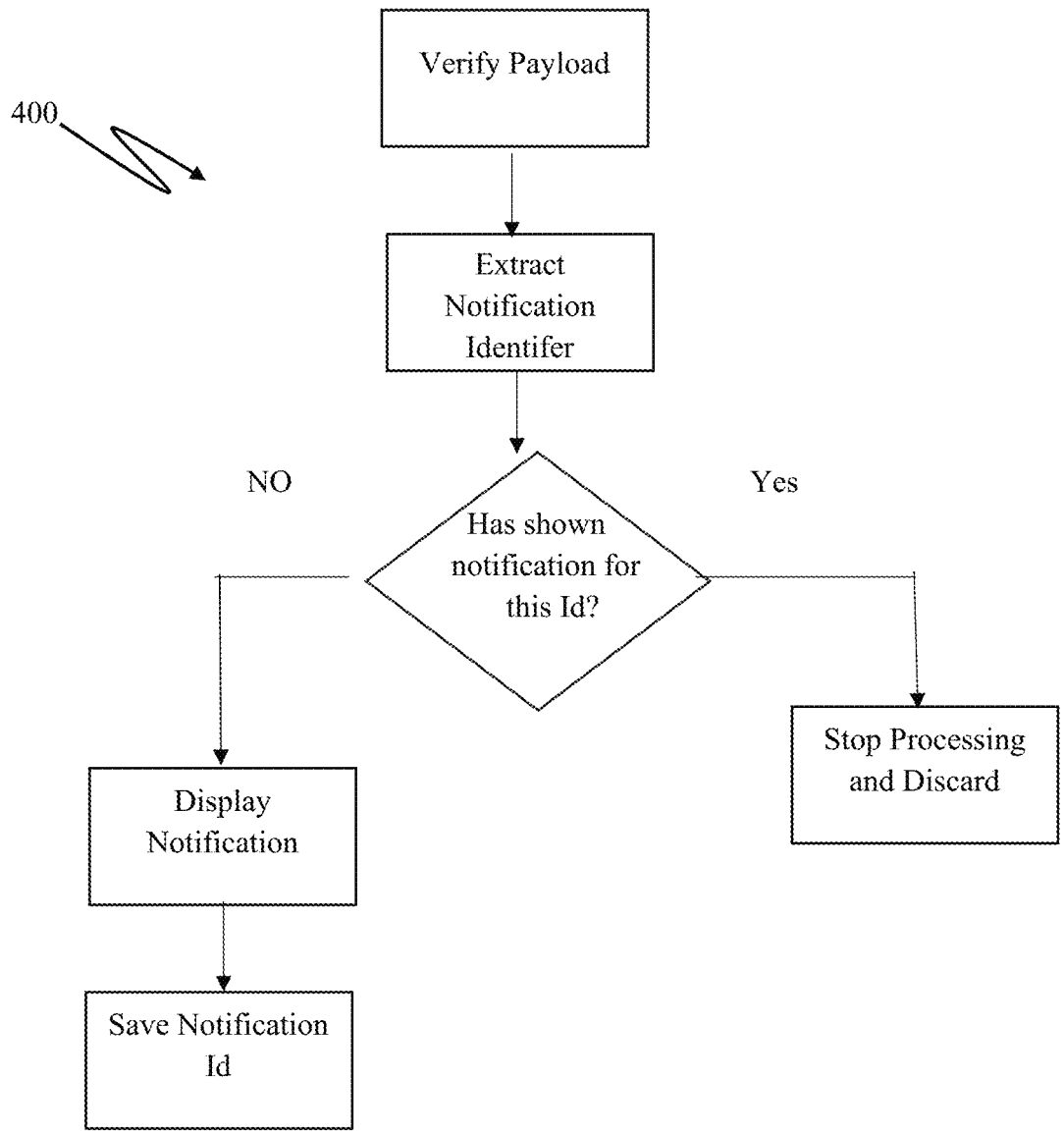
FIG. 4 illustrates a method of detecting failure in receiving a notification by a target user device, in accordance with an embodiment of the present disclosure.

In an embodiment, at step 210, the system may detect a failure in receiving the notification by the target user device via the first channel. For example, this has been explained with the help of FIG. 4 (400), the system 102 may detect the failure by monitoring delivery status of the notification through callbacks or delivery receipts provided by the OEM push service. The system may keep track of notifications that have been sent but not yet acknowledged as delivered. If the system does not receive a delivery confirmation within a specified time frame, the system may determine it a potential failure. In an embodiment, when the system transmits the notification, the server may include a payload with information such as content, title, metadata, and a unique notification identifier. In an embodiment, the system may verify the payload to ensure that the notification payload is correctly formatted and contains all necessary information. For example, the system may parse the notification payload received by the target user device and check for the presence of all the necessary fields. In an embodiment, the system may extract the unique notification identifier from the notification payload to track and verify the delivery status of the notification. The unique notification identifier is crucial for tracking notifications and determining whether a specific notification has been delivered and shown to the target user device. In one embodiment, the system may query a local database of the target user device to look up for an identifier matching the unique identification identifier. In yet another embodiment, the system may query its own database. For example, when a notification is received at the target device, the target user device may store the unique notification identifier in the local database and/or transmit the unique notification identifier to the system 102. The system may store the unique notification identifier in its database. In an embodiment, upon identifying a match between the extracted unique notification identifier and the identifier stored in the database, the system may determine that the notification has already been displayed on the user device. In case the notification has already been received the system stops the processing of the requested notification. In yet another case when the unique notification identifier does not match with an identifier present in the database, the system may display the notification on the target user device. In yet another embodiment, the system may compare the user device identifier and the notification identifier to determine the failure. The advantages of the above process is 1. Accuracy: The target device holds the most accurate and up-to-date information. Validating this data directly on the device minimizes potential errors that could arise from external factors such as network availability, as validating elsewhere introduces more variables and moving parts. 2. Reduced Server Load: By performing validations on individual devices, the load on cloud servers is significantly decreased. At scale, processing and validating data for billions of users would be time-consuming and costly if handled on the server side.

Figure 3:
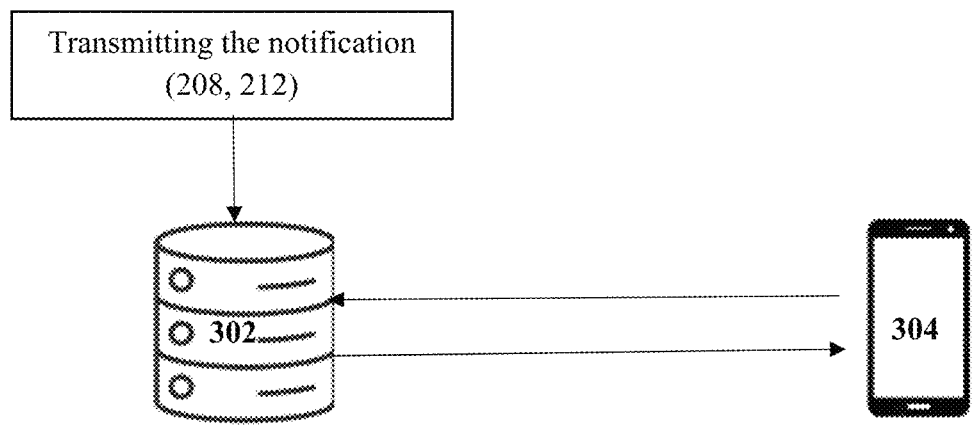
FIG. 3 illustrating a method of storing and fetching active notifications from a push amplification storage, in accordance with an embodiment of the present disclosure.

In an embodiment, the system may store the notification being sent via the first channel or any other channel in a push amplification storage 302 as shown in FIG. 3. Upon detecting the failure in notification delivery, the system may fetch the notification from the push amplification storage 302 to deliver the notifications to the target user device 304 via some other channel like second or third channel. Upon fetching the active notifications stored in the push amplification storage 302 may be transmitted to the target user device using the second or third channel as discussed in the disclosure.

In an embodiment, at step 212, the system in response to detecting the failure, transmits the notification to the target user device using the obtained Firebase Cloud Messaging (FCM) token via a second channel. For example, When the system detects a failure in delivering a notification through the OEM channel, the system may use Firebase Cloud Messaging (FCM) as a fallback mechanism. A specific FCM channel may be selected based on performance of that specific FCM channel. The system monitors the delivery status of the notification through callbacks or delivery receipts provided by the OEM push service. If the OEM service does not confirm delivery within a specified time frame, the system considers the delivery to have failed. When a delivery failure is detected, the system prepares to resend the notification via FCM. The system retrieves the FCM token for the target user device from the database. The system sends the notification payload to the FCM service endpoint using the FCM API. The FCM processes the request and attempts to deliver the notification to the target device. The system monitors the delivery status of the notification sent via FCM. If FCM confirms the delivery, the server updates the notification status in its database. In an embodiment, if the notification is not delivered successfully via FCM, the server may implement a retry mechanism to attempt re-delivery. This ensures higher reliability and increases the chances of successful delivery. Using FCM as a fallback ensures that notifications still reach the user device if the OEM channel fails, increasing overall reliability. Having multiple channels for notification delivery provides redundancy, ensuring that critical notifications are not missed. By implementing a mechanism to detect failures in the OEM channel and using FCM as a second channel for notification delivery, the system ensures that notifications are reliably delivered to the target user device.

Using multiple channels for delivering notifications significantly speeds up the process. This can be understood with the help of the following example: imagine the system needs to send notifications to 10 million target devices. If each channel has a Fair Usage Policy (FUP) limit of 100,000 notifications per minute, relying on a single channel would take 100 minutes to reach all devices. However, by leveraging multiple channels, the system splits the notifications among various Original Equipment Manufacturer (OEM) channels and Firebase Cloud Messaging (FCM), depending on the device manufacturer and token. This segmentation results in three groups: two groups of 3 million devices each, and one group of 4 million devices. By sending notifications to these groups simultaneously, the system drastically reduces the total delivery time. Instead of the original 100 minutes, the notifications are now sent in parallel, reducing the overall time to approximately 40 minutes. This approach ensures that notifications reach users more quickly and efficiently.

In an embodiment the system transforms the notification into a format compatible with the FCM tokens communication protocol. The system may transform the notification which was earlier compatible with the OEM tokens communication protocol to FCM tokens communication protocol. This transformation ensures that notifications can be delivered through multiple channels, enhancing reliability and ensuring delivery even if one channel fails. For example, the system may extract details from the notification and convert those into a JSON format compatible with FCM.

In yet another embodiment, at step 214, the system detects a failure in receiving the notification via the second channel, by the target user device. In an embodiment, the failure may be detected by the process of comparing identifiers as discussed above in the disclosure. At step 216, in response to detecting the failure, the system transmits the notification to the target user device using a third channel. For example, the system may monitor the delivery status of the notification sent via FCM. The FCM provides delivery receipts or callbacks indicating whether the notification was successfully delivered. If the system does not receive a delivery confirmation within a specified timeframe, it considers the delivery to have failed. This detection can be implemented using timeout mechanisms and periodic checks. When a failure is detected in FCM, the system prepares to resend the notification using a third channel. The third channel may be SMS, Email, or another notification service that can reach the user device.

In an embodiment the system transforms the notification into a format compatible with the third channels communication protocol. The system may transform the notification which was earlier compatible with the FCM tokens communication protocol to the third channels communication protocol. This transformation is necessary to ensure the notification can be delivered through another channel if the previous attempts via OEM and FCM channels fail.

The technical challenges addressed by the above-described mechanism of sending notifications through multiple channels in case of failure are:
1. Ensuring reliable and fault-tolerant communication: By including a multi-channel notification system, the technique effectively addresses the issue of relying on a single point of failure. In the event of a communication channel failure, the system has the capability to automatically transition to a backup channel, guaranteeing the successful delivery of crucial messages.
2. Improving system availability and uptime: This approach improves the overall availability and uptime of the notification system in critical systems or applications where downtime can have serious repercussions. In the event that one or more communication channels encounter problems or disruptions, the system can still operate by making use of the remaining functional channels.
3. Handling diverse communication channel requirements: Various notification channels may include distinct prerequisites, including diverse protocols, data formats, or security methods. This technique solves the problem of smoothly integrating and controlling various communication channels inside a single system.
4. Ensuring data integrity and consistency: By utilizing multiple channels, the mechanism can implement redundancy and data validation mechanisms to ensure that notifications are delivered consistently and without data corruption or loss.

5. Enhancing scalability and adaptability: With the emergence of new communication channels or technologies, the multi-channel notification system can be readily expanded to include extra channels, enhancing its scalability and adaptability to changing communication requirements.

The technological advancements in computer systems by implementing this mechanism include:
1. Improved fault tolerance and reliability: The mechanism enhances the overall fault tolerance and reliability of computer systems by providing redundant communication channels, reducing the risk of critical failures and improving the overall system robustness.
2. Increased availability and uptime: By ensuring that notifications are delivered even in the event of failures or outages, the mechanism contributes to increased system availability and uptime, which is crucial for mission-critical applications and services.
3. Better integration and interoperability: The mechanism facilitates the integration and interoperability of diverse communication channels within a single system, enabling seamless communication across different protocols, platforms, and technologies.
4. Enhanced scalability and flexibility: The design of the multi-channel notification system allows for easy integration of new communication channels, providing scalability and flexibility to adapt to changing communication needs and emerging technologies.
5. Improved user experience: By ensuring reliable and consistent delivery of notifications, the mechanism enhances the overall user experience, particularly in applications or systems where timely and accurate notifications are critical.

By overcoming the technical challenges and providing these technological advancements, the described mechanism contributes to the advancement of computer systems by improving their reliability, availability, and adaptability to diverse communication needs, ultimately enhancing the overall user experience and system performance.

However, each communication channel may use different protocols (e.g., HTTP, SMTP, XMPP, SMS, push notifications) with varying data formats, security mechanisms, and communication patterns. Integrating a third channel requires extensive development efforts to handle protocol-specific nuances, such as message formatting, authentication, error handling, and message queuing. Implementing a robust and efficient message queueing system to ensure proper ordering and delivery of notifications across multiple channels is a non-trivial task. Further, there are Scalability and load balancing challenges: As the number of communication channels and concurrent notifications increase, the system must be designed to handle high volumes of traffic and distribute the load effectively across multiple servers or instances. Each of the channels is isolated from the other channel so that processing in one channel does not affect the other. Thus, the system designed serves to handle all the related issues. Furthermore, Monitoring and fault detection across diverse channels: Monitoring the health and status of each communication channel in real-time is essential for timely failover and error recovery. Developing monitoring systems capable of detecting failures and performance issues across heterogeneous communication channels is a complex task that requires extensive knowledge of each channel's behaviour and failure modes. Moreover, Failover and recovery mechanisms: Implementing robust failover mechanisms that seamlessly switch to an alternative communication channel upon failure while preserving the state and order of notifications is a non-trivial challenge. Developing recovery strategies to handle partially delivered notifications, retransmissions, and rollback mechanisms to ensure data integrity and consistency is a complex endeavour. Further, Security and compliance considerations: Ensuring secure transmission of notifications across multiple channels, including encryption, access control, and compliance with industry-specific regulations (e.g., HIPAA, PCI-DSS), requires significant effort and expertise. Implementing secure key management, certificate handling, and authentication mechanisms for diverse communication channels is a complex undertaking. As each channel has its own unique failure codes and potential downtime issues. To ensure smooth operation, t alerts have been set up on each channel-specific queue to monitor the successful processing of messages. If the error rate from any provider exceeds a certain threshold, the system automatically switches to an alternative channel. For instance, if the OEM channel experiences downtime, the devices using this channel will be transitioned to the FCM channel. During this transition, the payload format will be updated to match the FCM requirements, and the tokens will be converted from OEM tokens to FCM tokens. This process ensures that notifications continue to be delivered seamlessly, even if one channel encounters issues.

By providing detailed explanations of the technical challenges involved in integrating a third communication channel, along with the complexity of implementing scalable, fault-tolerant, and secure mechanisms, it becomes evident that this solution it represents a significant technical advancement that requires substantial effort, expertise, and innovative solutions to overcome the intricate challenges associated with multi-channel communication systems.

Although implementations for methods and systems for transmitting a notification to a target user device via hierarchy of communication channels have been described in language specific to structural features and/or methods, it is to be understood that the appended claims are not necessarily limited to the specific features or methods described. Rather, the specific features and methods are disclosed as examples of implementations for processing one or more user events.

The invention claimed is:
1. A method for transmitting a notification to a target user device via hierarchy of communication channels, the method comprising:
receiving a request to send the notification to the target user device;
determining that the target user device is an opted-in device enabled to receive the notification;
obtaining at least a Firebase Cloud Messaging (FCM) Token and an OEM (Original Equipment Manufacturer) token associated with the target user device, wherein the FCM token and OEM token use different communication protocols and data formats;
transmitting the notification to the target user device using the OEM token via a first channel by transforming the notification into a format compatible with the OEM tokens communication protocol;
detecting a failure in receiving the notification by the target user device via the first channel;
responsive to detecting the failure, transmitting the notification to the target user device using the Firebase Cloud Messaging (FCM) token via a second channel by transforming the notification into a format compatible with the FCM tokens communication protocol;

detecting a failure in receiving the notification via the second channel, by the target user device, wherein the detection comprises:
  assigning a first unique identifier to the notification being transmitted to the target user device;
  comparing the first unique identifier with a second unique identifier; and
  detecting the failure based on a match between the first unique identifier and the second unique identifier; and
responsive to detecting the failure, transmitting the notification to the target user device using a third channel by transforming the notification in a format compatible with the third channels communication protocol.

2. The method of claim 1, wherein determining that the target user device is the opted-in device further comprises:
  monitoring periodically if the target user device has an application installed for which the notification is transmitted.

3. The method of claim 2, the periodic monitoring comprises transmitting silent notifications to the target user device at regular intervals of time to determine if the target user device is using the messaging service application.

4. The method of claim 1, wherein the second unique identifier is associated with a notification previously received by the target user device.

5. The method of claim 1 further comprises:
  storing the notification, first unique identifier, and second unique identifier in a database.

6. The method of claim 1, wherein the notification is an active notification, and wherein the active notification includes a pending status indicating that the active notification has not been delivered to the target user device.

7. The method of claim 6, wherein the active notification is active for a predetermined time period.

8. The method of claim 1, wherein the opted-in device is a device which has enabled permissions to receive the notification from an application.

9. The method of claim 1, further comprises:
  obtaining the OEM token and the FCM token associated with the target user device by sending requests via API (Application Programming Interfaces).

10. A system for transmitting a notification to a target user device via hierarchy of communication channels, the system comprising:
  a memory storing one or more instructions;
  a processor communicatively coupled with the memory, wherein the processor upon execution of the one or more stored instructions is configured to:
    receive a request to send the notification to the target user device;
    determine that the target user device is an opted-in device enabled to receive the notification;
    obtain at least a Firebase Cloud Messaging (FCM) Token and an OEM (Original Equipment Manufacturer) token associated with the target user device;
    transmit the notification to the target user device using the OEM token via a first channel;
    detect a failure in receiving the notification by the target user device via the first channel;
    responsive to detection of the failure, transmit the notification to the target user device using the Firebase Cloud Messaging (FCM) token via a second channel;
    detect a failure in receiving the notification via the second channel, by the target user device;
    assign a first unique identifier to the notification being transmitted to the target user device;
    compare the first unique identifier with a second unique identifier; and
    detect the failure based on a match between the first unique identifier and the second unique identifier and
  responsive to detection of the failure, transmit the notification to the target user device using a third channel.

* * * * *